Figure 1:
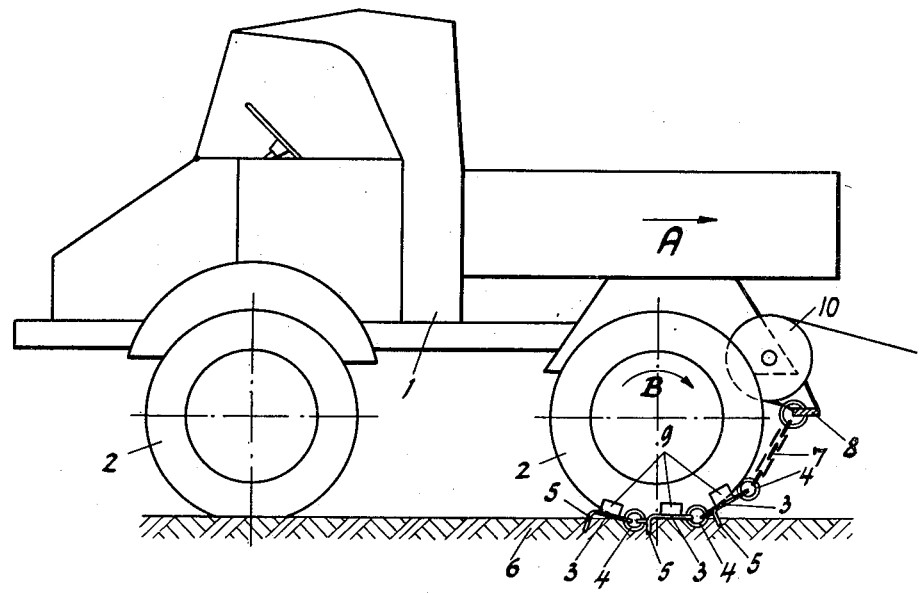

Dec. 4, 1956  H. G. F. ROESSLER  2,772,754
DEVICE FOR ANCHORING A ROAD VEHICLE
Filed April 9, 1952

INVENTOR
Heinrich G. F. Roessler
By: Dieke and Padlon
ATTORNEYS

500 # United States Patent Office 2,772,754
Patented Dec. 4, 1956

2,772,754
DEVICE FOR ANCHORING A ROAD VEHICLE

Heinrich G. F. Roessler, Gaggenau, Germany, assignor to Daimler-Benz Aktiengesellschaft, Stuttgart-Unterturkheim, Germany Application April 9, 1952, Serial No. 281,307

1 Claim. (Cl. 188—4)

The present invention relates to a device for anchoring a road vehicle.

Road vehicles, particularly motor-driven vehicles, are sometimes employed for the operation of devices such as hoisting devices or belt transmissions which will exert traction or pressure upon the vehicle tending to move same, and the vehicle must be anchored against such traction or pressure, for instance against the traction exerted by the cable of a hoist or by the belt of a transmission. While road vehicles are equipped with brakes, experience has shown that the effectiveness of a normal brake will not satisfy the requirements for safely anchoring the vehicle against the traction of the hoisting device or the belt transmission, because such traction may exceed the total friction of the tires of all of the wheels of the vehicle on the ground.

While props or braces have been employed for the purpose of anchoring the vehicle, such means involves the disadvantage of their large size required to ensure effectiveness. Moreover, brake blocks have been used, but such brake blocks in order to be effective must be unduly big and cumbersome, involving the additional disadvantage that the entire traction will be transferred to the vehicle frame via the rear wheel bearings and the rear axle.

It is an object of the present invention to provide anchoring means for the vehicle which are simple, inexpensive and effective, require but little space and may be readily applied to or removed from and stored on the vehicle.

Further objects of the present invention will appear from a detailed description of a preferred embodiment thereof which is shown on the accompanying drawing.

My novel anchoring device comprises substantially a flexible member which is adapted to be placed beneath and to support a vehicle wheel, at least one end of such member being attached to the frame of the vehicle. The flexible members which may resemble a track chain will be firmly pressed on the ground by the weight of the vehicle ensuring high relative friction between the member and the ground whereby the vehicle will be effectively anchored. The flexible member will be termed "carpet-member" hereinafter since it is placed on the ground like a carpet.

Figure 2:
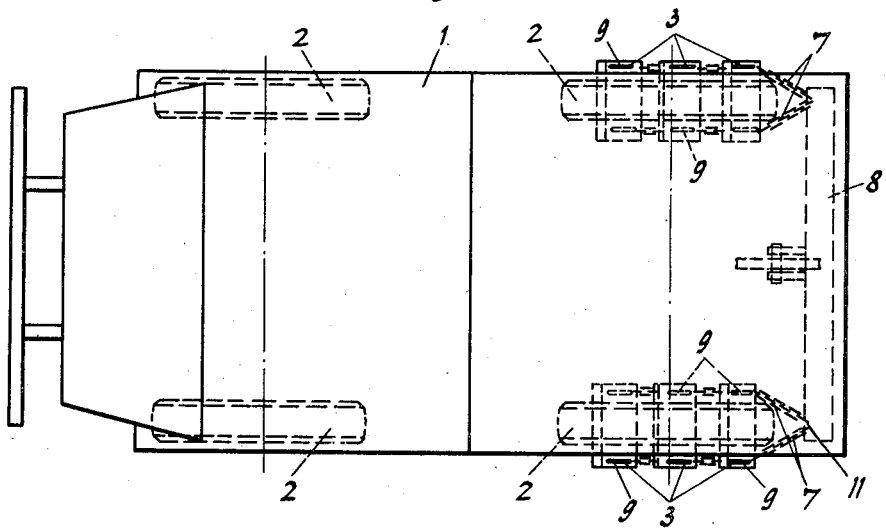

In the drawing in which a preferred embodiment of the invention is shown:

Fig. 1 is an elevation of a motor-driven vehicle equipped with my improved anchoring device in operative position and Fig. 2 is a plan view of Fig. 1.

In the drawing my invention is shown as applied to a power-driven motor vehicle 1 having four wheels 2 and a hoist mounted thereon including a cable drum 10 adapted to be driven by the engine of the vehicle. When the hoist is used for the purpose, for instance, of dragging a heavy log up to the vehicle, the resulting traction would tend to move the vehicle in the direction of the arrow A turning the wheels 2 in the direction of the arrow B.

For the purpose of anchoring the vehicle I have provided carpet members for at least one of the two pairs of the wheels 2, each carpet member comprising in the present embodiment a plurality of rigid elements such as plates 3 hinged to each other, for instance by means of annular links 4 resulting in a chain-like structure. The front end of each plate 3 is bent downwardly so as to constitute a downwardly projecting flange 5 adapted by the weight of the wheel placed thereon to be pressed into the ground 6. The track chain constituted by the plates 3 and the links 4 will be placed on the ground like a carpet and the vehicle will then be driven thereon whereupon the carpet member is anchored or attached to the frame of the vehicle. In the embodiment shown one end only of each carpet member is attached to the vehicle by suitable means, such as a pair of chains 7 extending from the rear corners of the rearmost plate 3 to a point 11 which is spaced from the wheel in the direction A of the traction acting on the vehicle. The point 11 of the vehicle is located in the present embodiment on a member 8 fixed to the vehicle frame positioned to the rear of a vertical plane extending through the rear axle of the vehicle. The member 8 may be a transverse bar and such bar may carry the hoisting device.

When the pair of the rear wheels 2 of the vehicle is driven in the direction of arrow A upon the pair of carpet members shown in Fig. 2 after same have been anchored to the bar 8, the chains 7 will be pulled taut and then the vehicle will be firmly anchored to the ground. In order to prevent the wheels from slipping off the carpet members laterally, the carpet members may be provided with upper projections laterally embracing the tires. In the embodiment shown such upper projections are formed by a pair of upright stop plates 9 integral with each plate 3 and spaced a distance corresponding at least to the width of the tire.

While I have described a preferred embodiment of the present invention, I wish it to be clearly understood that same is capable of numerous modifications within the scope of the appended claims. Thus, other suitable attaching means may be substituted for the chains 7 and the elements of the carpet members may be formed by elements other than the plates shown. Also, the vehicle need not be a four-wheeled vehicle of the kind illustrated.

What I claim is:

In a road vehicle with wheels and having a hoisting mechanism used to hoist, tow or draw objects to the vehicle, a pair of readily removable anchoring devices adapted to be placed beneath two of said wheels, each of said anchoring devices including a plurality of substantially rectangular plate members and of annular link members interconnecting adjacent plate members to thereby form a flexible chain-like structure in which said plate members alternate in succession with said link members, each plate member being provided with an angularly bent, downwardly projecting flange portion integrally formed therewith along the side thereof opposite said hoisting mechanism and extending over the entire width thereof to ensure a firm grip on the road when weighed down by a wheel and two upwardly extending lateral portions to accommodate the wheel therebetween, a frame member located in the rear of the vehicle, and chain means connecting each anchoring device to said frame member to be pulled taut when the vehicle is moved rearwardly to anchor said plates under the wheels of the vehicle and to thereby keep the vehicle in the anchored position when used to draw an object toward the vehicle.

References Cited in the file of this patent

UNITED STATES PATENTS

| | | |
|---|---|---|
| 1,897,853 | Mostaza | Feb. 14, 1933 |
| 2,042,352 | Miller | May 26, 1936 |
| 2,376,318 | Adkisson | May 15, 1945 |
| 2,451,470 | Buckley | Oct. 19, 1948 |
| 2,562,521 | Blattner | July 31, 1951 |